(12) United States Patent
Fäth et al.

(10) Patent No.: US 10,562,363 B2
(45) Date of Patent: Feb. 18, 2020

(54) SUPPORT UNIT (71) Applicant: SAF-HOLLAND GmbH, Bessenbach (DE)

(72) Inventors: Stefan Fäth, Aschaffenburg (DE); Stefan Wallmeier, Goldbach (DE)

(73) Assignee: SAF-HOLLAND GmbH, Bessenbach (DE)

(*) Notice: Subject to any disclaimer, the term of this patent is extended or adjusted under 35 U.S.C. 154(b) by 0 days.

(21) Appl. No.: 15/577,158

(22) PCT Filed: May 25, 2016

(86) PCT No.: PCT/EP2016/061794
§ 371 (c)(1),
(2) Date: Nov. 27, 2017

(87) PCT Pub. No.: WO2016/193094
PCT Pub. Date: Dec. 8, 2016

(65) Prior Publication Data
US 2018/0178609 A1 Jun. 28, 2018

(30) Foreign Application Priority Data
May 29, 2015 (DE) .......................... 10 2015 108 519

(51) Int. Cl.
*B60G 11/28* (2006.01)
*F16F 9/05* (2006.01)
*F16M 13/02* (2006.01)

(52) U.S. Cl.
CPC .............. *B60G 11/28* (2013.01); *F16F 9/057* (2013.01); *F16M 13/02* (2013.01); *B60G 2204/126* (2013.01); *B60G 2206/424* (2013.01)

(58) Field of Classification Search
CPC .............. B60G 11/28; B60G 2204/126; B60G 2206/424; F16F 9/057; F16M 13/02
See application file for complete search history.

(56) References Cited

U.S. PATENT DOCUMENTS 3,033,558 A * 5/1962 Slemmons .............. B60G 11/28
267/64.24
4,506,910 A * 3/1985 Bierens .................. B60G 11/27
267/64.21
(Continued)

FOREIGN PATENT DOCUMENTS

DE 19702155 11/1997
DE 102004061989 7/2006
(Continued)

OTHER PUBLICATIONS

European Patent Office, International Search Report, dated Apr. 24, 2017.

*Primary Examiner* — Anita M King
(74) *Attorney, Agent, or Firm* — Price Heneveld LLP (57) ABSTRACT

Support unit for use on an air spring, having a main body and a reinforcement element, wherein the main body has a first contact side for fixing to the chassis of a utility vehicle, wherein the reinforcement element is fixable to a second contact side of the main body and is designed for supporting a plunger of an air spring, wherein the reinforcement element is formed from a material of higher strength and/or hardness than the main body.

18 Claims, 4 Drawing Sheets

(56) References Cited

U.S. PATENT DOCUMENTS

| | | | | |
|---|---|---|---|---|
| 4,784,376 A * | 11/1988 | Ecktman | B29C 65/568 | 267/64.27 |
| 4,787,606 A * | 11/1988 | Geno | F16F 9/0463 | 267/64.24 |
| 4,890,823 A * | 1/1990 | Koschinat | B60G 11/27 | 267/64.27 |
| 5,060,916 A | 10/1991 | Koschinat et al. | | |
| 5,180,146 A * | 1/1993 | Schneider | F16F 9/057 | 267/122 |
| 5,535,994 A * | 7/1996 | Safreed, Jr. | B60G 11/28 | 267/122 |
| 5,934,652 A * | 8/1999 | Hofacre | B60G 7/04 | 267/64.23 |
| 6,024,343 A * | 2/2000 | Ebert | B60G 11/28 | 267/124 |
| 6,113,081 A * | 9/2000 | Hilburger | B60G 7/04 | 267/64.24 |
| 6,527,259 B1 * | 3/2003 | Nemeth | F16F 9/057 | 267/64.21 |
| 6,682,058 B1 * | 1/2004 | Nemeth | B60G 7/04 | 267/122 |
| 8,950,764 B2 * | 2/2015 | Egolf | B60G 11/22 | 267/64.11 |
| 9,334,916 B2 * | 5/2016 | Neitzel | B60G 11/27 | |
| 9,556,922 B2 * | 1/2017 | Egolf | B60G 11/27 | |
| 10,369,855 B2 * | 8/2019 | Moulik | F16F 9/049 | |
| 2002/0030312 A1 * | 3/2002 | Capek | B60G 11/28 | 267/64.27 |
| 2006/0226586 A1 | 10/2006 | Levy | | |
| 2008/0211150 A1 * | 9/2008 | Levy | B60G 11/28 | 267/64.27 |
| 2009/0160110 A1 * | 6/2009 | Eise | F16F 9/057 | 267/64.21 |

FOREIGN PATENT DOCUMENTS

| | | |
|---|---|---|
| DE | 202005007933 | 9/2006 |
| EP | 0647795 | 4/1995 |

* cited by examiner

SUPPORT UNIT

BACKGROUND OF THE INVENTION

The present invention relates to a support unit for use on or with an air spring.

Support units, in particular for supporting the plunger of an air spring, are known from the prior art. They are required in particular if the utility vehicle is intended to be able to perform crane loading, wherein the utility vehicle is raised, and the pivotable control arms suspended on the air springs are displaced downward by the weight of the wheels of the utility vehicle, wherein the plunger is pulled out of the air spring. In this case, it has proven to be advantageous to provide a facility for raising the plunger from the control arm. In this way, excessively high loads on the air spring bellows, and tearing of the latter, are prevented. To nevertheless position the plunger correctly on the control arm, a support unit is provided which supports the plunger, and holds it in the correct position relative to the control arm, during normal operation of the utility vehicle. As a result of this design, however, more components are required than in the case of a conventional plunger, and the weight of the air spring is higher, owing to the multiplicity of different components in engagement with one another, than in the case of a plunger of unipartite form.

It is an object of the present invention to provide a support unit which permits firstly high operational reliability, flexible adaptation to different air spring units, and a reduction in weight of the air spring and/or of the assemblies adjoining the air spring unit.

SUMMARY OF THE INVENTION

According to the invention, the support unit has a main body and a reinforcement element, wherein the main body has a first contact side for fixing to the chassis of a utility vehicle, wherein the reinforcement element is fixed or fixable to a second contact side of the main body and is designed for supporting a plunger of an air spring, wherein the reinforcement element is formed from a material of higher strength and/or hardness than the main body. In other words, the support unit is preferably a part of a plunger of multi-part form of an air spring, wherein the support unit is designed for being fixed preferably to the trailing arm of the utility vehicle in order to hold the other components of the plunger in the correct position relative to the control arm during the use of the utility vehicle. Here, the main body is particularly preferably produced from as lightweight a material as possible. Aluminum materials or plastics materials or else fiber composite materials, inter alia, are expedient for this purpose. A disadvantage of these relatively lightweight materials is that they often exhibit relatively low resistance to abrasion and surface wear. For this reason, a reinforcement element is fixable or preferably fixed to the main body, which reinforcement element protects the corresponding contact sides, in particular the second contact side of the main body, against wear as a result of abrasion, shocks or high local pressure forces. In this way, the service life of the support unit can be considerably increased because, in particular, the plungers, which are normally manufactured from metal or similarly hard materials, no longer lie directly on the lightweight and relatively soft material of the main body but rather are preferably supported exclusively on the reinforcement element. Here, the reinforcement element has a higher strength and/or hardness than the material of the main body. In this context, a distinction is made between the material characteristic of strength and the material characteristic of hardness. Here, the strength is in particular the resistance to tension, compression or torsion forces, which prevents a plastic deformation or tearing or buckling of the reinforcement element. The hardness of the reinforcement element or of the material of the reinforcement element is in particular the characteristic of the capability of the surface of the reinforcement element to resist the ingress of bodies into the surface of the reinforcement element. In this context, consideration is given in particular to the Brinell hardness as a material characteristic. It may be particularly preferable for in particular that side of the reinforcement element which is averted from the plunger and from the second contact side of the main body to have a higher surface hardness than the side facing toward the plunger. In particular, the highest load on the surface is to be expected at said outwardly facing side of the reinforcement element, because those parts of the plunger or of the air spring which are adjacent thereto act on the surface of the reinforcement element. It is however also a known relationship that, with greater hardness of a particular metallic material, the strength thereof, in particular the resistance thereof to brittle fracture, decreases. It is therefore preferable to provide a compromise between high strength and adequately high hardness, particularly preferably for the material of the reinforcement element, which firstly ensures adequate elasticity of the material of the reinforcement element and secondly permits as far as possible only little surface wear during the operation of the support unit on the reinforcement element. It is particularly preferably the case that, after the plunger has fully set down on the main body, the force transmitted from the plunger to the main body is absorbed only by that side of the main body which is situated opposite the first contact side. The lateral, preferably conical regions of the second contact side with the at least one reinforcement element arranged thereon preferably serve in this case for the guidance of the plunger and the protection of the material of the main body during the setting-down or lifting-off of the plunger onto or from the main body.

The main body is particularly preferably formed from plastic. Plastic is suitable as a production material because it is particularly inexpensive to produce and can for example be molded even into relatively complex shapes in a simple manner and without great manufacturing effort. Here, as plastic, a fiber-reinforced plastic is particularly preferably provided, which is reinforced for example with fibers of a metallic material or of a carbon fiber or aramid fiber material in the corresponding regions. The main body is in this case particularly preferably produced by injection molding. In the context of the main body being formed from plastic, it is however self-evident that, for example, metallic inserts may be provided in which, for example, there is provided a thread for the fixing of the main body to the control arm by means of a screw. In the context of the present invention, it is self-evidently the intention that the major part of the main body is formed from plastic.

It is furthermore preferable for the reinforcement element to be formed from metal. A metallic material such as for example steel preferably achieves the compromise, required for the reinforcement element of the present invention, between adequately high strength and adequately high surface hardness. In this way, the service life of the reinforcement element, and thus also of the support unit as a whole, can be considerably increased. It is particularly preferable for the reinforcement element to be formed as a deformed metallic workpiece or as a forged part.

The reinforcement element particularly preferably has an abutment surface and a holding section, wherein the abutment surface is averted from the main body, and wherein the holding section is or can be placed in engagement with the main body. The holding section is preferably an at least regionally curved section of the reinforcement element, which forms an undercut with a corresponding geometry on the main body, or which can be placed in positively locking engagement with the main body in some other way. In a particularly preferred embodiment, in which the reinforcement element is encapsulated in the material of the main body in the region of the holding section, the holding section is preferably equipped with a barb-like geometry, which permits secure, positively locking and cohesive engagement with the material of the main body. The abutment surface is preferably of substantially flat form toward the outside; in other words, the abutment surface is provided on that side of the reinforcement element which is averted from the main body and said abutment surface is substantially flat, planar or provided with a slight rounding. The abutment surface particularly preferably makes it easier for a plunger to slide along the support unit during the setting-down of the plunger. It is furthermore preferable for the mean extent of the abutment surface to be approximately at least twice the mean extent of the holding section. In this way, a particularly large abutment surface can be provided with a reinforcement element, whereby the transmission of force from the plunger to the reinforcement element can be optimized, and the surface wear on the reinforcement element and on the plunger is as low as possible. It is thus possible to provide a weight-optimized design of the reinforcement element, wherein, for a particular abutment surface or size of the abutment surface, the weight of the reinforcement element is nevertheless relatively low, because the holding section has a relatively small extent and thus also a relatively low weight.

The holding section preferably is, or can be, placed in positively locking engagement with a securing section of the main body. In particular, the holding section is in this case designed such that it can be placed into a detachable connection, for example in the form of a click-action connection, with a corresponding securing section of the main body. In a particularly preferred embodiment of the support unit, the holding section is in this positively locking engagement with the securing section of the main body. Furthermore, it is preferable for the main body to have multiple securing sections, with which a reinforcement element can be selectively placed in engagement. In this way, it is possible to produce support units of different design using one and the same main body. It is self-evident that, the more reinforcement elements are arranged on a main body, the higher the weight of the support unit, but at the same time, a larger abutment surface for a plunger or a similar component of the air spring is provided on the support unit. Thus, the flexible and detachable arrangement of reinforcement elements on the main body permits an adaptation of the support unit to the requirements to be met during the operation of the utility vehicle.

In a further preferred embodiment, the reinforcement element is regionally encapsulated in the material of the main body. In other words, it is preferably the case here that the holding section of the reinforcement element is at least regionally, preferably entirely, encapsulated by the material of the main body. In this way, both a cohesive connection and a positively locking connection can be produced between the main body and the reinforcement element. The advantage of this embodiment is that the connection between reinforcement element and main body is stronger than that in the case of a purely positively locking connection between the reinforcement element and the main body. It is a disadvantage that it is not readily possible for the reinforcement element, when it reaches the end of its service life, to be removed from the main body and replaced with a new reinforcement element. This embodiment is therefore advantageous in particular on utility vehicles with very high loading of the interface between the support unit and the other components of the air spring, because, in particular, vibrations in the chassis system are not transmitted, or are transmitted only to a very minor extent, into the interface between the reinforcement element and the main body, because these are connected to one another in such a firm manner that no friction owing to vibrations occurs between said two components.

The holding section is particularly preferably placed in positively locking engagement with the securing section by elastic deformation of the reinforcement element, wherein the securing section and holding section form an undercut, and wherein the engagement between the holding section and the securing section is releasable. The reinforcement element particularly preferably has two holding sections, of which a first holding section can be firstly placed in engagement with a corresponding securing section on the main body by a user, wherein, through subsequent elastic deformation or bending of the material of the reinforcement element situated between the holding sections, the second holding section can likewise be placed in positively locking engagement with a second securing section on the main body. Owing to the elastic restoring action of the material of the reinforcement element, both holding sections are subsequently held in their positively locking connection with the respective securing section. It is particularly preferably possible, through renewed elastic deformation of the reinforcement element, for at least one of the holding sections of the reinforcement element to be moved out of engagement with the respectively corresponding securing section, whereby the reinforcement element can be removed from the main body. The form of the engagement between the holding section and the securing section as a releasable connection is particularly suitable if, for various applications, a different number of reinforcement elements is to be arranged on a main body, or if, after the reinforcement elements reach the end of their service life, said reinforcement elements are to be exchanged and replaced with new ones.

It is furthermore preferable for a securing element to be provided for securing the holding section on the main body. In addition or alternatively to the positively locking connection between the holding section and the securing section, it is particularly preferable for a securing element to be provided, by means of which the holding section can be fixed to the main body. Here, the securing element preferably engages on the main body and has an undercut geometry which can be placed in engagement with the holding section in order to secure said holding section on the main body. In the simplest embodiment, the securing element is a simple screw which can be led through a corresponding cutout on the holding section and screwed together with the main body. In particular if high levels of deformation can sometimes occur on the reinforcement element during the operation of the utility vehicle and of the support unit, a securing element provides an additional securing action for preventing a release of the positively locking engagement between the main body and the reinforcement element. In other words, during the operation of the support unit, the securing element cannot be released as easily as the positively locking engagement that is produced by a user by bending the reinforcement element. It is self-evident that, as a disadvantageous consequence of this, the assembly effort for a support unit is however increased.

The reinforcement element particularly preferably has a multiplicity of holding sections. It is particularly preferable for at least two holding sections to be provided on the reinforcement element, which can each be placed in engagement with corresponding securing sections on the main body. It is furthermore preferably also possible for further holding sections to be provided on the reinforcement element, which further holding sections can be placed in positively locking engagement with the corresponding securing sections on the main body. The main body particularly preferably has a greater number of securing sections than are actually occupied by holding sections. In this way, it is possible to realize a particularly preferably non-uniform distribution of reinforcement elements on the main body, in order to preferably make it possible for the forces that act with greater or lesser intensity in different directions during the use of the utility vehicle to be correspondingly opposed by a greater or lesser number of reinforcement elements on the main body. Here, on the other hand, it is possible for a multiplicity of applications and different utility vehicles to be provided with corresponding support units using one and the same main body, because it is easily possible for the number of reinforcement elements and the positioning thereof on the main bodies to be adapted to the respective operating conditions.

The second contact side of the main body is particularly preferably of substantially conical or frustoconical form. The second contact side is preferably that side of the main body which faces toward a corresponding abutment surface on a plunger of an air spring. The second contact side is in this case particularly preferably the shell surface of a cone or of a frustum. It is furthermore preferably possible for the second contact side to also jointly encompass the upper face surface, that is to say that face surface of the frustum which is averted from the first contact side, because it is also possible in this region for the plunger of the air spring to be placed in abutment against the main body. Here, it is preferable that all of the relevant sections, or sections which can be placed in engagement with the plunger, of the second contact side can each be equipped with reinforcement elements. In this context, "substantially conical" defines in particular a shape corresponding substantially to a geometrical cone, on which however securing sections or local rounded portions, for example, at the edges may be provided at the transition to the second contact side or to the top side of the main body, which securing sections or local rounded portions are intended to be defined as likewise being associated with the substantially conical or frustoconical geometry. It is furthermore preferably possible, for weight saving purposes, for additional cutouts to be provided on the substantially conical geometry in order to realize local material savings and reduce the weight of the main body.

The abutment surface of the reinforcement element particularly preferably has a maximum spacing from the second contact side, wherein the ratio of the maximum spacing to a mean diameter of the second contact side amounts to 0.02-0.3, preferably 0.05-0.2 and particularly preferably approximately 0.05-0.1. The abutment surface, that is to say that side or surface of the reinforcement element which is averted from the second contact side, preferably has a maximum spacing from the second contact side or from the surface of the second contact side. This makes it possible in particular for even plungers which have a relatively large extent in relation to the extent of the second contact side to be fixed to a substantially smaller main body by means of the reinforcement element. The arrangement of more metallically-elastically resilient material between the second contact side of the main body and the corresponding section of the plunger furthermore preferably makes it possible for vibrations and shocks transmitted from the plunger to the main body to be correspondingly dampened or cushioned by means of the reinforcement element. The mean diameter of the second contact side is particularly preferably defined as the mean diameter of the second contact side perpendicular to a vertical axis or axis of symmetry or axis of rotational symmetry of the conical or frustoconical second contact side. In other words, the mean diameter is in this case the diameter of the second contact side at the mid-height position thereof. Here, the range of 0.02-0.3 of the ratio of the maximum spacing to a mean diameter of the second contact side encompasses all embodiments tested, and considered to be advantageous, in the context of the present invention. In particular, said largest ratio permits an adequately good compromise between an increase in weight of the reinforcement element at the upper limit of the ratio of 0.3, and an excessively low spring action by the reinforcement element at the lower limit of the ratio of 0.02. For highly loaded utility vehicles, it has been found that a ratio of the maximum spacing to the mean diameter of 0.05 should not be undershot because, in this way, an adequate spring action by the reinforcement element is provided. For such utility vehicles, it has however also been found that, with a value which does not exceed 0.2, it is also possible to achieve an adequately low weight, whereby the support unit can, overall, contribute to an optimization of weight of the utility vehicle. The particularly preferred range of 0.05-0.1 has in this case proven expedient in particular for utility vehicles in the case of which frequent crane loading is performed. In this context, the lower value of the ratio of 0.05 permits adequately good cushioning of shocks and vibrations by means of the reinforcement element during the crane loading, and the value of only 0.1 of the ratio characterizes a weight-optimized design of the reinforcement element.

It is particularly preferable for a multiplicity of reinforcement elements to be provided on the main body, which reinforcement elements are arranged in a distributed manner on the second contact side. In a first preferred embodiment, the reinforcement elements may be arranged so as to be distributed uniformly over the circumference, that is to say uniformly for example along the circumference of the main body, or of the second contact side of the main body, defined at the level of the mean diameter. In this way, by means of the reinforcement elements, the same effects can be achieved in all loading directions.

In an alternative embodiment, the reinforcement elements are fixable in a non-uniformly distributed manner to the second contact side. Here, the non-uniform distribution of the reinforcement elements on the second contact side serves in particular for the local reinforcement of the main body of the support unit, in order to realize greater support or reinforcement of the main body by means of the reinforcement elements for example on the front side and on the rear side of the main body in the longitudinal direction of the utility vehicle than at those surfaces of the main body which face toward the vehicle center and toward the vehicle outer side. It has furthermore been found that reinforcement of the main body on that side of the main body which is averted from the pivot axis of the control arm offers advantages because, during loading of the utility vehicle, the control arm protrudes with the support unit deeper into the plunger, whereby greater reinforcement by means of the reinforcement elements is necessary on that side of the main body which is situated opposite the pivot axis, or at the outside, than on that side of the main body which faces toward the pivot axis.

The main body particularly preferably has a strut on its side averted from the second contact side, wherein the reinforcement element is fixed to the second contact side at the level of the strut. It is thus particularly preferably the case that the main body has a strut construction, or a framework-like construction, on its preferably inwardly facing side. Here, it is particularly preferable for the reinforcement element or the preferably provided multiplicity of reinforcement elements to be arranged in each case at the level of a or the respective strut. In this way, the reinforcement element can be supported directly via the strut. An introduction of force thus also takes place, which force acts from the plunger via the reinforcement element into the main body, directly via the reinforcing strut. In this way, it is possible to realize greater stability, whereby material between the struts can be saved, and a weight saving can be realized.

The main body particularly preferably has, on the first contact side, an engagement section which is preferably arranged eccentrically on the first contact side. The first contact side of the main body is preferably the surface by means of which said main body is set down on the control arm of a utility vehicle and can be fixed to the control arm. To prevent rotation of the main body relative to the control arm, there is preferably provided on the first contact side an engagement section which is arranged eccentrically in relation to preferably the axis of symmetry or planes of symmetry that are possibly provided on the main body. Thus, on a preferably conical or frustoconical main body, the engagement section is preferably arranged spaced apart from the central axis or axis of rotational symmetry of the main body. The engagement section is particularly preferably formed as a projection which can be placed in engagement with a corresponding geometry on the control arm. In addition to the engagement section, the main body preferably has, on the first contact side, a fastening section into which for example a screw or a bolt can be inserted and fixed by means of a thread in the fastening section of the main body. Here, the main body is preferably pressed against the control arm, wherein the engagement section ensures prevention of rotation of the main body relative to the control arm of the utility vehicle.

The abutment surface of the reinforcement element preferably has a longitudinal extent transversely or perpendicularly with respect to the first contact side and a peripheral extent along a circumferential direction running around the axis of symmetry of the main body, wherein the longitudinal extent is greater than the peripheral extent. In other words, the reinforcement element is thus of substantially elongate form, wherein the longer side of the reinforcement element is arranged on the main body substantially transversely with respect to the plane spanned by the first contact side. Here, the longitudinal extent is particularly preferably at least twice the peripheral extent of the abutment surface. In this way, it is possible for a plunger to slide along from the relatively narrow side of the main body in the direction of the relatively wide side of the main body, wherein the plunger is supported in the direction of the longitudinal extent of the abutment surface of the reinforcement element by the reinforcement element. The abutment surface is preferably formed and arranged substantially parallel to the second contact side of the main body. In the present case, "substantially parallel" means that the abutment surface of the reinforcement element does not imperatively have to have the same radius of curvature as the second contact side of the main body, but rather may also be of substantially flat or planar form. Here, the peripheral extent of the abutment surface of the reinforcement element is preferably no greater than one tenth, particularly preferably no greater than one twentieth, the circumference of the second contact side of the main body at the level of the mean diameter.

The longitudinal extent of the reinforcement element is particularly preferably at least 0.3 times, particularly preferably at least 0.6 times, and the longitudinal extent of the reinforcement element is particularly preferably equal to, the extent of the second contact region parallel to the axis of symmetry. Here, the axis of symmetry is preferably the axis of symmetry of a main body of substantially conical or frustoconical form. A line parallel to said axis of symmetry thus defines the height of the main body, wherein the longitudinal extent of the reinforcement element is at least 0.3 times said height of the main body, particularly preferably the height of the second contact region of the main body. In the case of a longitudinal extent of the reinforcement element of at least 0.6 times the extent of the second contact region parallel to the axis of symmetry, it is possible in particular for weight to be saved, wherein a plunger can nevertheless slide along the reinforcement element over a major and sufficient length of the second contact region and pass into its final position on the support unit. The longitudinal extent of the reinforcement element is particularly preferably at least equal to the extent of the second contact region parallel to the axis of symmetry, wherein the entire second contact region is shielded by the reinforcement element and, furthermore, if the reinforcement element has an extent greater than the extent of the second contact region parallel to the axis of symmetry, that region of the main body which lies on the top side of the second contact region is also protected by the reinforcement element. In a particularly preferred embodiment, the reinforcement element is designed such that it overlaps the main body on two sides, wherein the longitudinal extent of the reinforcement element is substantially greater than twice the extent of the second contact region parallel to the axis of symmetry.

The reinforcement element is particularly preferably formed as a wearing part which is exchangeable after it reaches the end of its service life. In particular if a sheet-metal part of relatively thin-walled form is used as reinforcement element, it is advantageous that this can, after wear, be easily exchanged by a technician without additional tools. It is furthermore preferable for such reinforcement elements to be able to be produced as standard components in large unit quantities, which lowers the manufacturing costs and furthermore permits universal usability of the same type of reinforcement elements on different support units. In this way, the overall manufacturing costs for the support unit can be reduced, wherein, through the use of particularly thin-walled reinforcement elements, the weight of the support unit can be drastically reduced.

Reinforcement elements are preferably provided which cover not only the conical, lateral part of the second contact side but also the upper, substantially ring-shaped part of the second contact side, which is situated opposite the first contact side of the main body. The reinforcement elements are thus suitable for absorbing the weight force of the utility vehicle, which via the plunger in a vertical direction, that is to say transversely with respect to the first contact surface, and transmitting it uniformly to the material of the main body. The reinforcement elements thereby prevent wear of the main body both at the laterally situated regions of the second contact side and in the ring-shaped upper region of the second contact side. Here, the reinforcement elements preferably keep shocks and similar force impulses away from the top side of the main body.

It is particularly preferable for a reinforcement ring to be fixable to the second contact side, which reinforcement ring reinforces the main body with respect to an exertion of force on the second contact side by the plunger. The reinforcement ring is particularly preferably inserted into a corresponding ring-shaped groove on the main body, wherein the material in the edge region of the groove particularly preferably forms an undercut with the reinforcement ring, which undercut holds said reinforcement ring in position. It is furthermore preferable for the reinforcement ring to be encapsulated by the material of the main body. The reinforcement ring serves for reinforcing the second contact side of the main body, wherein, in particular, the forces acting in a radial direction that arise as a result of the action of the plunger on the top side of the main body are absorbed by the reinforcement ring. Said forces are in this case absorbed in the material of the reinforcement ring as tensile stresses. The reinforcement ring is preferably produced from steel, which can absorb particularly high tensile stresses. It is alternatively preferable for the reinforcement ring to be formed from a carbon fiber material, which, although more expensive than steel, can absorb greater tensile stresses while being of considerably reduced weight.

The reinforcement ring is preferably fixed to that side of the main body which is situated opposite the first contact side. With this arrangement, the reinforcement ring is particularly well designed for absorbing the forces exerted by the plunger perpendicular to the first contact side and introducing said forces into the material of the main body. The reinforcement ring may in this case preferably be fixed, additionally to reinforcement elements that are likewise fixed to the second contact surface, to the main body. Here, the reinforcement elements secure the conical part of the second contact side of the main body against contact with the plunger.

BRIEF DESCRIPTION OF THE DRAWINGS

Further advantages and features of the present invention will emerge from the following description with reference to the appended figures. It is self-evident that individual features shown only in particular embodiments or figures may also be used in other embodiments unless this has been explicitly ruled out or is prohibited owing to technical circumstances.

In the figures.

DETAILED DESCRIPTION OF THE PREFERRED EMBODIMENTS

Figure 1:
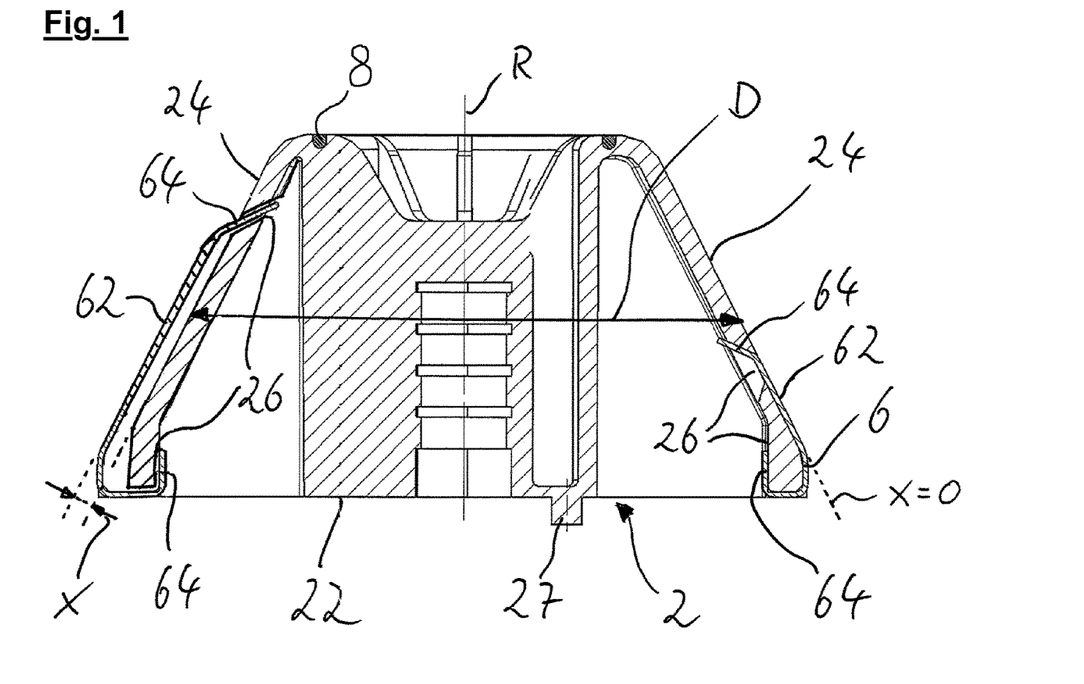
FIG. 1 shows a sectional view of a preferred embodiment of the support unit according to the invention.

In the embodiment of the support unit shown in FIG. 1, a substantially frustoconical main body 2 is provided. Deviations from the frustoconical shape consist in particular in the securing sections 26 and in the rounded portions on the second contact side 24. At a bottom side, the main body 2 has a first contact side 22, at which the main body can be fixed to a chassis part of a utility vehicle. The main body 2 is preferably fixed, preferably fixedly screwed, to a control arm of a chassis. Here, the engagement section 27 serves for rotationally securing the main body 2. The engagement section engages into a corresponding geometry, for example a cylindrical cutout, on the chassis part. A cutout with a thread, for example, is provided in the main body centrally in relation to an axis of symmetry R. A thread of a screw or bolt can be fixed, which braces the main body 2 against the chassis part, can be placed in engagement in said thread. At least one reinforcement element 6 is fixed to the second contact side 24 of the main body 2. Here, the reinforcement element 6 illustrated on the left is a first embodiment, and the reinforcement element 6 illustrated on the right is a further, preferred embodiment, of the reinforcement element 6. The difference between the two reinforcement elements 6 consists in that the left-hand reinforcement element 6 has an abutment surface 62 with a greater maximum spacing x from the first contact side 24 and a greater longitudinal extent than the reinforcement element 6 shown on the right. The reinforcement element 6 shown on the left is in this case preferably connected only in positively locking fashion to the main body 2, wherein the reinforcement element 6 is prevented from sliding out downward by the support of the main body 2 on a chassis part (not shown). The reinforcement element 6 has two holding sections 64 which engage in positively locking fashion into corresponding securing sections 26. To fix the reinforcement element 6 to the main body 2, said reinforcement element is preferably regionally elastically deformed in order, for example, for firstly the lower holding section 64 and subsequently the upper holding section 64 to be placed in respective positively locking engagement with the corresponding securing section 26. In the embodiment of the reinforcement element 6 shown on the left in FIG. 1, said reinforcement element is inserted into the main body 2 from below. The reinforcement element 6 shown on the right in FIG. 1 is encapsulated in the material of the main body 2, preferably in the region of the holding sections 64 and particularly preferably also in the region of the holding surface 62. In other words, reinforcement elements 6 are already inserted or embedded into the casting mold of a main body 2 in the manner shown on the right in FIG. 1 and are subsequently encapsulated by the material, preferably plastic or a light metal. FIG. 1 also illustrates the mean diameter D of the second contact side 24 of the main body 2, which mean diameter is in a certain ratio with respect to the maximum spacing x of the abutment surfaces 62 from the contact side 24 or the surface thereof in the region of the reinforcement element 6. The reinforcement element 6 shown on the left in FIG. 1 has a maximum spacing x of greater than 0. The reinforcement element shown on the right in FIG. 1 has a maximum spacing x equal to 0. It is preferably possible, through the use of the reinforcement element 6 shown on the left in the figure, for a plunger (not shown) which has a greater inner diameter than the respectively corresponding diameter of the second contact side 24 to be pushed onto the support unit. Thus, the plunger is supported relative to the main body 2 substantially or exclusively by means of the reinforcement elements.

Figure 2:
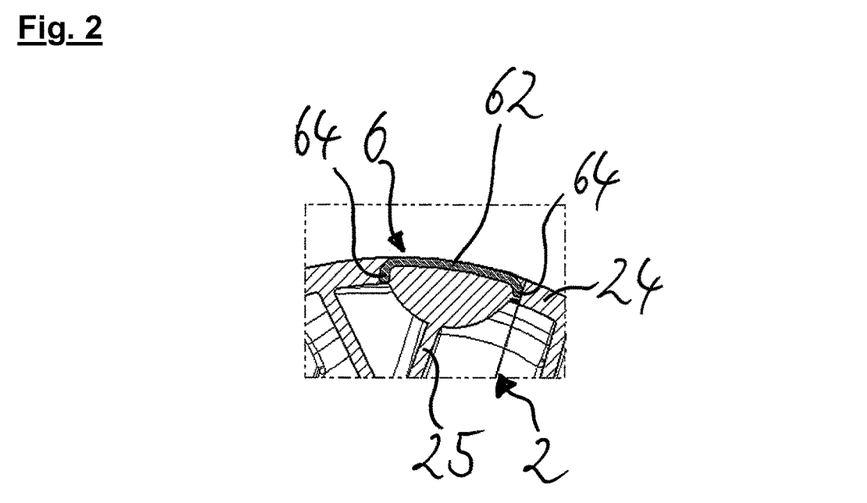
FIG. 2 shows a view, in a section parallel to the second contact side, of an embodiment of the support unit.

FIG. 2 shows a detailed view of the reinforcement element 6 shown on the right in FIG. 1. It can be seen here that the reinforcement element 6 also has lateral holding sections 64 which engage into the material of the main body 2. It is particularly preferable here for the cohesion to be realized by means of additional positive locking between the holding sections 64 and the corresponding geometries of the main body 2. It is also illustrated that the reinforcement element 6 is fixed to the main body 2 preferably at the level of a strut 25. In this way, a force can be introduced from the reinforcement element 6 directly into the strut 25, and the stability of the support unit can thus be increased, wherein the weight of the main body 2 can be reduced.

Figure 3:
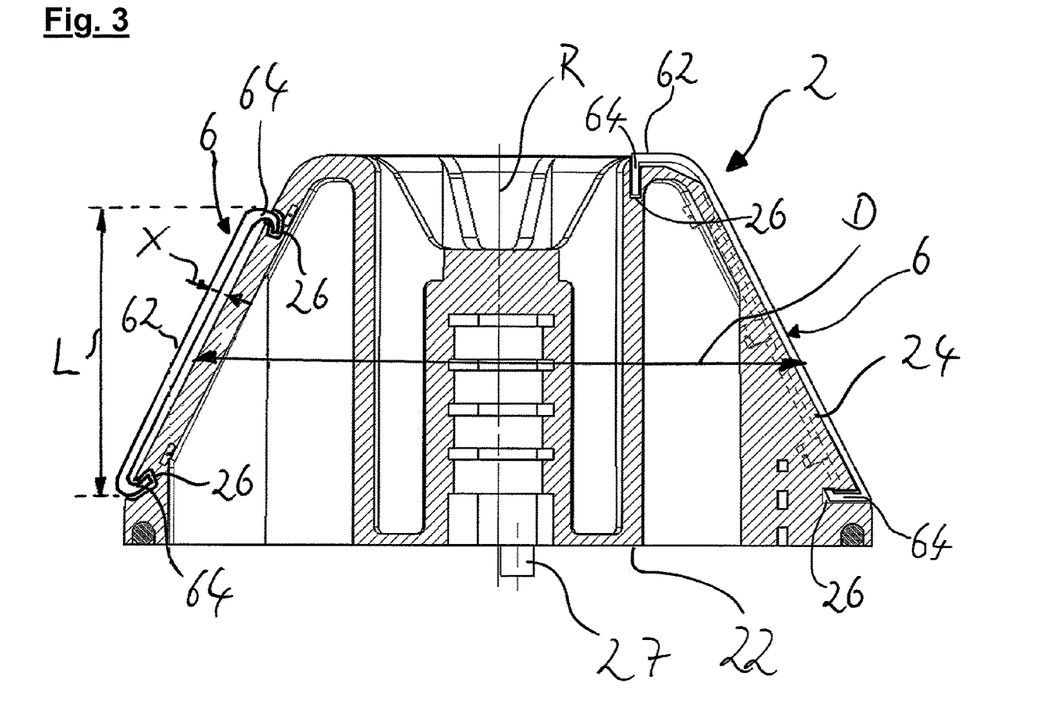
FIG. 3 shows a sectional view of a further embodiment of the support unit.

FIG. 3 shows a sectional view of a preferred embodiment of the support unit according to the invention, which is very similar to the embodiment shown in FIG. 1. By contrast to the reinforcement element 6 in FIG. 1, the reinforcement element 6 of FIG. 3 is fixed in positively locking fashion to the main body 2, wherein the holding sections 64 engage in the manner of claws into corresponding securing sections 26 of the main body 2. In other words, the distal ends of the holding sections 64 preferably run toward one another. To place the reinforcement element 6 into positively locking engagement with the main body 2, an elastic deformation of the reinforcement element is necessary, preferably in the region of the abutment surface 62. It is therefore preferable for the reinforcement element 6 to be of relatively thin-walled design, preferably as a thin metal sheet, in order that a user can place the reinforcement element 6 in engagement with the main body 2 simply by applying a manual bending force. The ratio of the longitudinal extent L of the reinforcement element 6 to the extent of the main body 2 along or parallel to the axis of symmetry R is also shown in FIG. 3. In the present case, the longitudinal extent L of the reinforcement element 6 is approximately two thirds of the extent of the main body 2 parallel to the axis of symmetry R.

Figure 4:
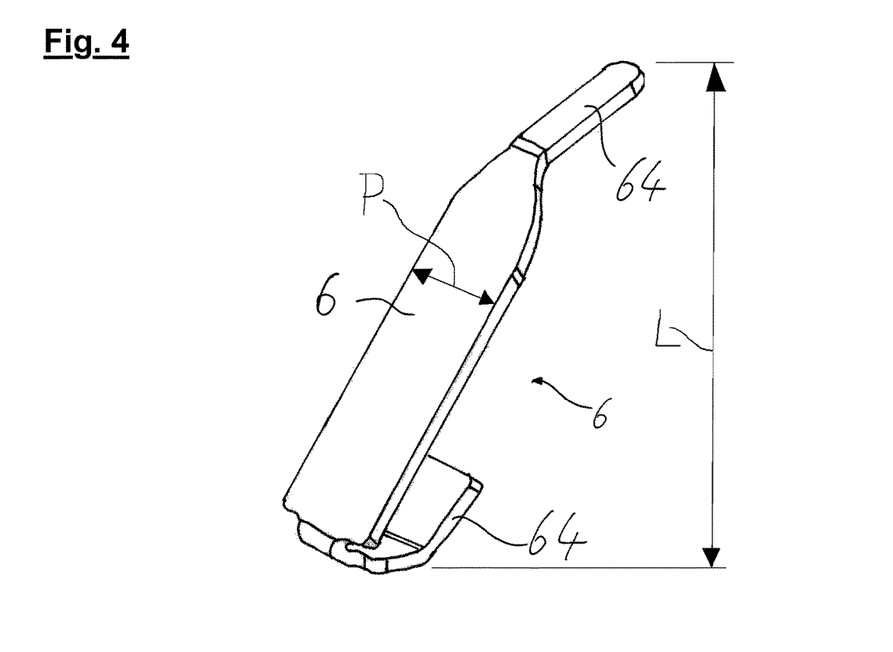
FIG. 4 shows a perspective view of a preferred embodiment of a reinforcement element according to the invention.

FIG. 4 shows a reinforcement element 6 in a perspective view. The reinforcement element 6 shown in FIG. 4 is preferably used in the embodiment shown in FIG. 1. The reinforcement element 6 has two holding sections 64. Furthermore, in the case of the reinforcement element 6 illustrated in FIG. 4, the relationship between the peripheral extent P and the longitudinal extent L is shown. The longitudinal extent L however arises for the first time in the assembled state of the reinforcement element 6 on the main body 2.

Figure 5:
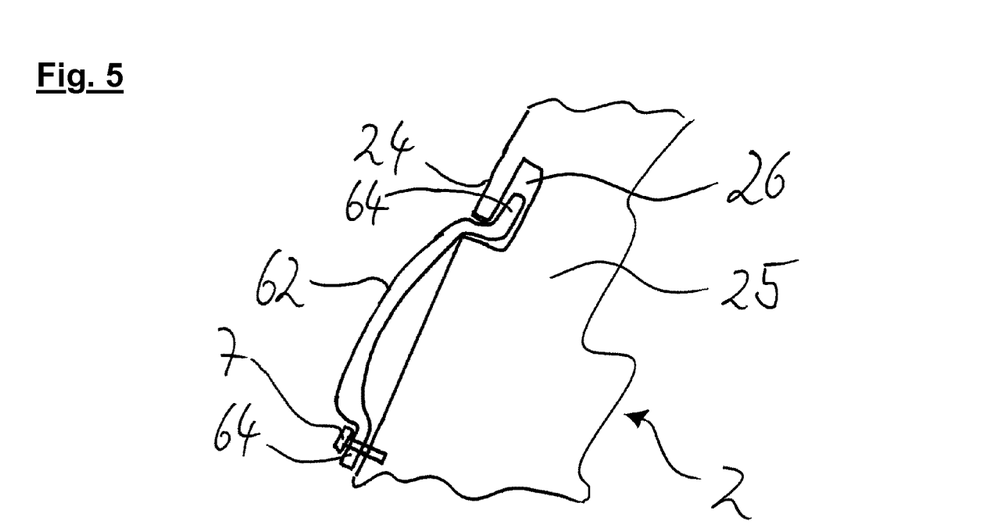
FIG. 5 shows a sectional view of a further preferred embodiment of the support unit.

FIG. 5 shows a sectional view of a further preferred embodiment of the support unit according to the invention, wherein the reinforcement element 6 has a first holding section 64 which can be placed in engagement with the corresponding securing section 26 of the main body 2. A securing element 7 is provided on a second holding section 64 of the reinforcement element 6. The securing element 7 is for example a screw or a bolt. This embodiment is suitable in particular if the reinforcement element, preferably in the region of the abutment surface 62, has such a material thickness that manual elastic deformation of the reinforcement element 6 is not possible. In this way, it is possible for firstly the upper holding section 64 to be placed in positively locking engagement with the main body 2 and subsequently the lower holding section 64 of the reinforcement element 6 to be fixed to the main body 2 by means of the securing element 7.

Figure 6:
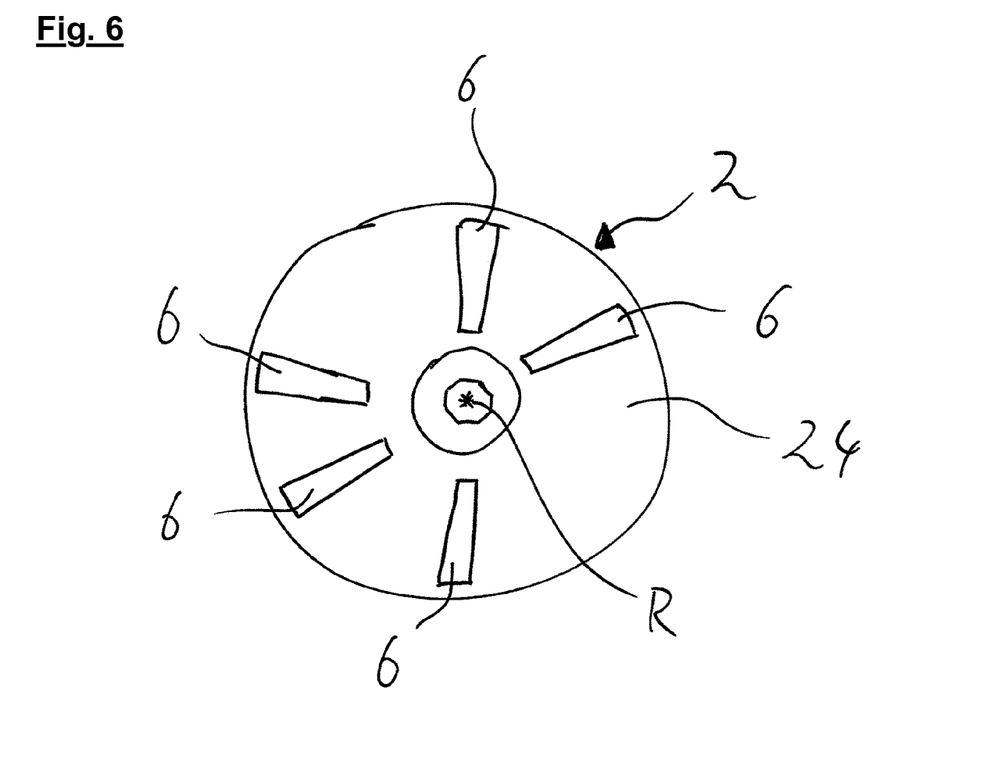
FIG. 6 shows a plan view of a preferred embodiment of the support unit according to the invention.

FIG. 6 schematically shows a plan view of a main body 2 with reinforcement elements 6 fixed thereto. The reinforcement elements 6 are preferably fixed to the main body 2 in a manner distributed non-uniformly over the circumference of the second contact side 24 of said main body. In this way, relatively high or relatively low forces in particular directions on the main body during the use of the utility vehicle can be accommodated. It is self-evident that the subject matter shown in FIG. 6 is merely exemplary, and it is also possible for a greater number of reinforcement elements 6 or a smaller number, for example 4 reinforcement elements 6, to be arranged on the main body 2 in order to protect the main body 2, particularly preferably the second contact side 24 thereof, against direct contact with a plunger of an air spring unit of a utility vehicle.

Figure 7:
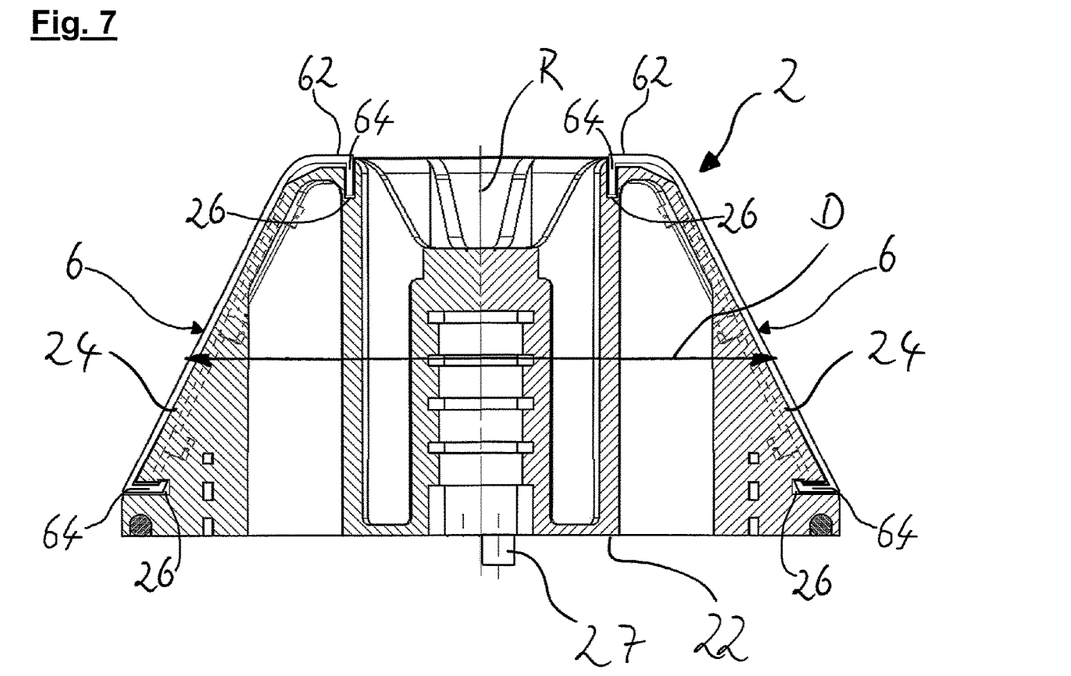
FIG. 7 shows a sectional view of a further preferred embodiment of the support unit according to the invention.

FIG. 7 shows a sectional view of a preferred embodiment of the main body 2. Here, reinforcement elements 6 are provided which cover not only the conical, lateral part of the second contact side 24 but also the upper, substantially ring-shaped part of the second contact side 24, which is situated opposite the first contact side 22. The reinforcement elements 6 are thus suitable for absorbing the weight force of the utility vehicle, which via the plunger 10 in a vertical direction, that is to say transversely with respect to the first contact surface 22, and transmitting it uniformly to the material of the main body 2. The reinforcement elements 6 thereby prevent wear of the main body 2 both at the laterally situated regions of the second contact side 24 and in the ring-shaped upper region of the second contact side 24. It is self-evident that, in the embodiment shown in FIG. 7, for further reinforcement, a reinforcement ring 8 as in the embodiment of FIG. 1 may be fixed to the second contact side 24, even though this is not explicitly shown in FIG. 7.

Figure 8:
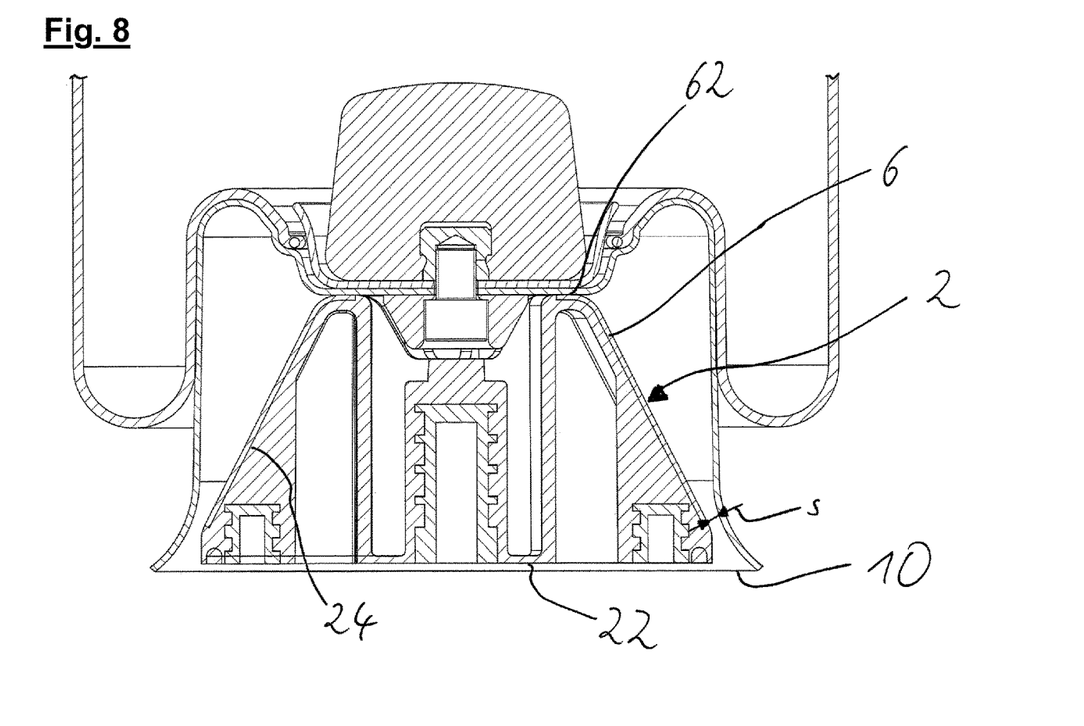
FIG. 8 shows a sectional view of a preferred embodiment of the support unit with plunger arranged thereon.

FIG. 8 shows a sectional view of a preferred support unit with a plunger 10 arranged thereon. Here, in the lateral, conical region of the second contact surface 24, the plunger is preferably spaced apart from the main body 2 and from the reinforcement elements 6 fixed thereto. It is particularly preferably the case that, when the plunger 10 fully sets down on the upper, ring-shaped part of the second contact surface, a clearance s remains between the plunger 10 and the main body 2, or the reinforcement elements 6. The centering of the plunger on the main body 2 is realized by means of the substantially frustoconical cutout formed into the upper region of the main body, into which cutout a cone fixed to the plunger 10 engages. Said clearance s is preferably also provided between the main bodies 2 shown in FIGS. 1, 3 and 7 and plungers 10 (in each case not shown) arranged thereon. An alignment of the cone that engages into the corresponding cutout on the top side of the main body 2 is preferably performed by means of the adjustment of the screw fixed to the bottom side of the plunger 10. In this way, the setting-down of the plunger 10 onto the main body 2, in particular onto the top side of the second contact surface 24 of the main body 2, can be finely adjusted. It is thus preferably the case that the cone on the plunger 10 in interaction with the cutout or conical depression on the main body 2 secures the plunger 10 against lateral displacement relative to the main body 2 when the plunger 10 lies fully on the main body 2, whereas a clearance s remains between the main body 2 and plunger 10 in the lateral region of the second contact surface. It is self-evident, in the light of the similar geometrical design of the top side of the main body 2, that this feature, which is explicitly shown only in FIG. 8, is also preferred in the embodiments of FIGS. 1, 3 and 7.

LIST OF REFERENCE DESIGNATIONS

2—Main body
6—Reinforcement element
7—Securing element
8—Reinforcement ring
22—First contact side
24—Second contact side
25—Strut
26—Securing section
27—Engagement section
62—Abutment surface
64—Holding section
D—Mean diameter
L—Longitudinal extent
P—Peripheral extent
R—Axis of symmetry
s—Clearance
x—Maximum spacing

The invention claimed is:

1. A support unit for use on an air spring, comprising:
a main body; and
a reinforcement element;
wherein the main body has a first contact side configured to be fixed to the chassis of a utility vehicle;
wherein the reinforcement element is configured to be fixed to a second contact side of the main body and is configured to support a plunger of the air spring;
wherein the reinforcement element comprises a material of at least one of higher strength and higher hardness than the main body; and
wherein at least one of the main body comprises plastic, and the reinforcement element comprises metal, and wherein at least a portion of the reinforcement element is exposed from the material of the main body.

2. The support unit as claimed in claim 1, wherein the second contact side is at least one of substantially conical shaped and substantially frustoconical shaped.

3. A support unit for use on an air spring, comprising:
a main body; and
a reinforcement element;
wherein the main body has a first contact side configured to be fixed to the chassis of a utility vehicle;
wherein the reinforcement element is configured to be fixed to a second contact side of the main body and is configured to support a plunger of the air spring;
wherein the reinforcement element comprises a material of at least one of higher strength and higher hardness than the main body; and
wherein the reinforcement element has an abutment surface and a holding section, wherein the abutment surface is averted from the main body, and wherein the holding section is configured to be placed in engagement with the main body.

4. The support unit as claimed in claim 3, wherein the holding section is configured to be placed in positively locking engagement with a securing section of the main body.

5. The support unit as claimed in claim 3, wherein a securing element is configured to secure the holding section on the main body.

6. The support unit as claimed in claim 3, wherein the reinforcement element has a multiplicity of holding sections.

7. The support unit as claimed in claim 3, wherein the abutment surface has a maximum spacing from the second contact side, and wherein the ratio of the maximum spacing to a mean diameter of the second contact side is within the range of 0.02 to 0.3.

8. The support unit as claimed in claim 7, wherein the ratio of the maximum spacing to a mean diameter of the second contact side is within the range of 0.05 to 0.2.

9. The support unit as claimed in claim 8, wherein the ratio of the maximum spacing to a mean diameter of the second contact side is within the range of 0.05 to 0.1.

10. The support unit as claimed in claim 7, wherein a multiplicity of reinforcement elements are configured which are arranged in a distributed manner on the second contact side, and wherein the reinforcement elements are configured to be fixed in a preferably non-uniformly distributed manner to the second contact side.

11. The support unit as claimed in claim 1, wherein the abutment surface has a longitudinal extent transversely with respect to the first contact side and a peripheral extent along a circumferential direction running around an axis of symmetry of the main body, wherein the longitudinal extent is greater than the peripheral extent, and wherein the longitudinal extent of the reinforcement element is preferably at least 0.3 times the extent of the second contact region parallel to the axis of symmetry.

12. The support unit as claimed in claim 11, wherein the longitudinal extent of the reinforcement element is preferably at least 0.6 times the extent of the second contact region parallel to the axis of symmetry.

13. The support unit as claimed in claim 12, wherein the longitudinal extent of the reinforcement element is equal to or greater than the extent of the second contact region parallel to the axis of symmetry.

14. A support unit for use on an air spring, comprising:
a main body; and
a reinforcement element;
wherein the main body has a first contact side configured to be fixed to the chassis of a utility vehicle;
wherein the reinforcement element is configured to be fixed to a second contact side of the main body and is configured to support a plunger of the air spring;
wherein the reinforcement element comprises a material of at least one of higher strength and higher hardness than the main body; and
wherein the reinforcement element is regionally encapsulated in the material of the main body, and wherein the reinforcement element is regionally exposed from the material of the main body.

15. The support unit as claimed in claim 14, wherein the reinforcement element has a holding section that is configured to be placed in positively locking engagement with a securing section of the main body by elastic deformation of the reinforcement element, wherein the securing section and the holding section form an undercut, and wherein the engagement between the holding section and the securing section is releasable.

16. A support unit for use on an air spring, comprising:
a main body; and
a reinforcement element;
wherein the main body has a first contact side configured to be fixed to the chassis of a utility vehicle;
wherein the reinforcement element is configured to be fixed to a second contact side of the main body and is configured to support a plunger of the air spring;

wherein the reinforcement element comprises a material of at least one of higher strength and higher hardness than the main body; and wherein the main body has a strut on a side averted from the second contact side, and wherein the reinforcement element is fixed to the second contact side at the level of the strut, and wherein the reinforcement element provides an outer surface.

17. A support unit for use on an air spring, comprising:

a main body; and a reinforcement element;

wherein the main body has a first contact side configured to be fixed to the chassis of a utility vehicle;

wherein the reinforcement element is configured to be fixed to a second contact side of the main body and is configured to support a plunger of the air spring;

wherein the reinforcement element comprises a material of at least one of higher strength and higher hardness than the main body; and wherein a reinforcement ring is configured to be fixed to the second contact side, wherein the reinforcement ring reinforces the main body with respect to an exertion of force on the second contact side by the plunger.

18. The support unit as claimed in claim 17, wherein the reinforcement ring is fixed to a side of the main body which is situated opposite the first contact side.

* * * * *

UNITED STATES PATENT AND TRADEMARK OFFICE
CERTIFICATE OF CORRECTION

PATENT NO. : 10,562,363 B2
APPLICATION NO. : 15/577158
DATED : February 18, 2020
INVENTOR(S) : Fäth et al.

Page 1 of 1

It is certified that error appears in the above-identified patent and that said Letters Patent is hereby corrected as shown below:

In the Claims

Column 14, Claim 11, Line 18:
"1" should be – 3 –

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*